United States Patent [19]
Kelly et al.
[11] 3,718,864
[45] Feb. 27, 1973

[54] CROSSOVER DETECTOR

[75] Inventors: William J. Kelly, Sauquoit; Warren A. Reynolds, Ilion, both of N.Y.
[73] Assignee: Cogar Corporation, Wappingers Falls, N.Y.

[22] Filed: Feb. 26, 1971
[21] Appl. No.: 119,109

[52] U.S. Cl. ..................328/115, 307/235, 307/264, 307/290, 328/146, 328/150, 328/164
[51] Int. Cl. ..............................................H03k 5/20
[58] Field of Search......307/230, 235, 236, 262, 264, 307/290; 328/28, 146–150, 164, 165, 142, 128, 115–116; 330/300

[56] References Cited

UNITED STATES PATENTS

| | | | |
|---|---|---|---|
| 3,541,457 | 11/1970 | Leighty et al. | 328/150 |
| 3,205,372 | 9/1965 | Pacl, Jr. | 307/290 X |
| 3,348,068 | 10/1967 | Miller | 307/235 |
| 3,398,373 | 8/1968 | Caswell | 307/235 X |
| 3,443,127 | 5/1969 | Zimmerman | 307/290 |
| 3,546,486 | 12/1970 | Jacobson | 328/164 X |
| 3,533,005 | 10/1970 | Alm | 330/30 D X |
| 3,564,289 | 2/1971 | Smith | 307/227 X |
| 3,604,957 | 9/1971 | Satula | 330/30 D X |

OTHER PUBLICATIONS

Pub. I "Differential Schmitt Trigger with 200-K Input Impedance" in Electronics, Jan. 23, 1967, pages 90–91, 307–290

*Primary Examiner*—Stanley D. Miller, Jr.
*Attorney*—Gottlieb, Rackman & Reisman

[57] ABSTRACT

A crossover detector utilizing an operational amplifier, a first input of which is connected through a resistor to ground and the second input of which is connected to the signal source. The output is fed back through an RC circuit to the first input. The time constant of the RC circuit is such that the prior art hysteresis time-delay error is eliminated because a hysteresis effect is introduced only immediately after a crossover is detected; the hysteresis effect decays exponentially and is essentially totally absent by the time that the next crossover occurs.

7 Claims, 6 Drawing Figures

INVENTOR
WILLIAM J. KELLY
WARREN A. REYNOLDS
BY Gottlieb, Rackman & Reisman
Harry M Weiss
ATTORNEYS

CROSSOVER DETECTOR

This invention relates to crossover detectors, and more particularly to crossover detectors exhibiting neither multiple-crossing errors nor time-delay errors.

A crossover detector is a circuit for determining when an input signal crosses above or below a reference level. The output of the detector is maintained at one of two predetermined values -- at a first value when the input signal is below the reference level and at a second value when the input signal is above the reference level. The output thus changes state each time that the input signal crosses over the reference (threshold) level.

The simplest prior art crossover detector consists of a difference amplifier. A reference potential is applied to one input of the amplifier, and the input signal is applied to the other. Depending on the relative polarities of the potentials at the two inputs, the output is at one of two values. But this simple crossover detector is subject to multiple-crossing errors. Although the ideal input passes through the reference level smoothly, there is often noise superimposed on the information signal. While the true signal itself crosses the reference level only once in passing from one extreme to the other, the superimposed noise may actually cause the overall signal to pass through the reference level an odd number of times. For example, in the case of a rising signal the reference level may be crossed, but superimposed noise may cause the overall input signal to momentarily drop below the reference level and then to rise above it as the signal continues to increase toward the upper extreme. In such a case, the output signal indicates that two additional crossovers took place when in fact they did not take place in the information signal itself.

To avoid multiple-crossing errors of this type, prior art crossover detectors have employed operational amplifiers in which the output signal is fed back to the reference input terminal of the amplifier. This has the effect of providing a "hysteresis" signal region on either side of the reference level. Crossovers are not detected when the total input signal passes through the reference level. Instead, an upward crossover is detected only when the total input signal passes through a level slightly above the reference level, and a downward crossover is detected only when the total input signal passes through a level slightly below the reference level. Although this approach eliminates multiple-crossing errors in the case where the noise amplitude is less than the magnitude of the hysteresis range, the output of the crossover detector is necessarily delayed relative to the true crossovers because the input signal must rise to a level above the reference level or fall to a level below the reference level before any crossover is registered. Furthermore, the time-delay errors are not constant and instead depend upon the amplitude of the input signal relative to the hysteresis range.

It is a general object of my invention to provide a crossover detector which is not subject to multiple-crossing and time-delay errors.

Briefly, in accordance with the principles of my invention, a capacitor is included in the feedback path of the prior art type crossover detector which utilizes an operational amplifier. The same reference level is used to detect a crossover in either direction. But as soon as the output of the operational amplifier changes state, the feedback to the reference input provides a hysteresis effect. This prevents any superimposed noise on the input signal from changing the output of the crossover detector in the opposite direction. The time constant of the feedback circuit is such that the hysteresis effect dies down (with the charging of the capacitor) prior to the next expected crossover. In this manner, there is no hysteresis effect whenever a crossover is first detected so that there is no time-delay error. The hysteresis effect is introduced only immediately after the crossover so that multiple-crossing errors cannot take place.

It is a feature of my invention to include a capacitor in the feedback circuit of an operational amplifier utilized as a crossover detector.

Further objects, features and advantages of my invention will become apparent upon consideration of the following detailed description in conjunction with the drawing, in which.

Figure 1:
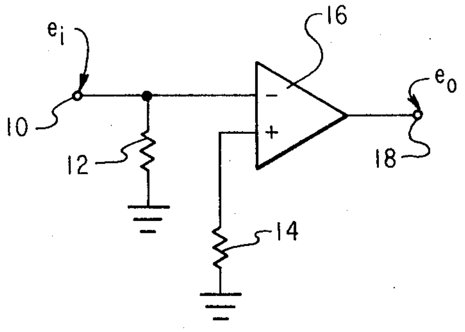
FIG. 1 PRIOR ART
FIG. 1 depicts a prior art crossover detector subject to multiple-crossing errors.

Referring to the prior art circuit of FIG. 1, ground potential is applied through resistor 14 to the plus (reference) input of difference amplifier 16. The input signal $e_i$ at terminal 10 is coupled to the minus input of the difference amplifier. Resistor 12, of the same magnitude as resistor 14, connects the minus input of the amplifier to ground so that the two inputs of the amplifier are balanced. The output of the difference amplifier is connected to terminal 18 at which the output signal $e_o$ appears. The difference amplifier causes its output to be saturated at a high level (+V) whenever the input signal is negative, and causes the output signal to be saturated at a lower level (−V) whenever the input signal is positive.

Figure 2:
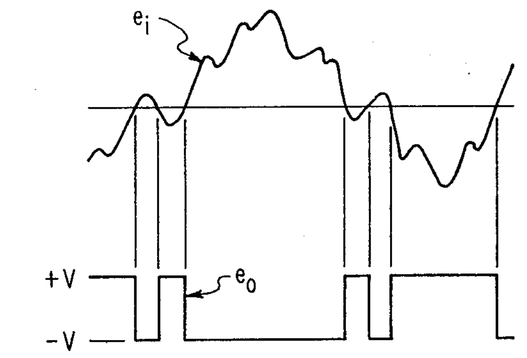
FIG. 2 depicts a timing waveform applicable to the prior art circuit of FIG. 1.

FIG. 2 depicts the multiple-crossing errors which can result when noise is superimposed on the input information signal. The input signal $e_i$ is not smooth as a result of the noise. Initially, the input signal is negative and the output signal is at the +V level. As soon as the overall input signal passes through the threshold level (ground) in the upward direction, the output goes negative. In the absence of noise, the input signal would then continue to rise to its peak value. But in the presence of noise, the input signal may momentarily drop below ground as shown. When this happens, the output switches to the +V level. Shortly thereafter, as the input signal continues to rise, another upward crossover is detected and the output drops to the −V level.

Similarly, at the next crossover, three transitions take place in the output signal, the two extra transitions resulting from the superimposed noise. Also, as shown to the right of FIG. 2, it is possible in some cases that there will be no multiple-crossing errors. This occurs when the superimposed noise is not sufficient to cause the input signal to momentarily fall above or below the threshold level following an initial crossing. Since there is no constant number of multiple-crossing errors associated with each true crossover, there is no simple way to ignore the erroneous crossovers.

Figure 3:
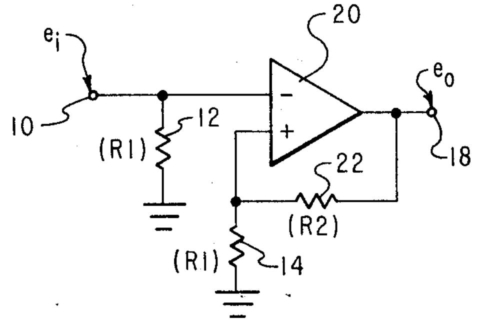
FIG. 3 PRIOR ART
FIG. 3 depicts a prior art circuit subject to time-delay errors.
Figure 4:
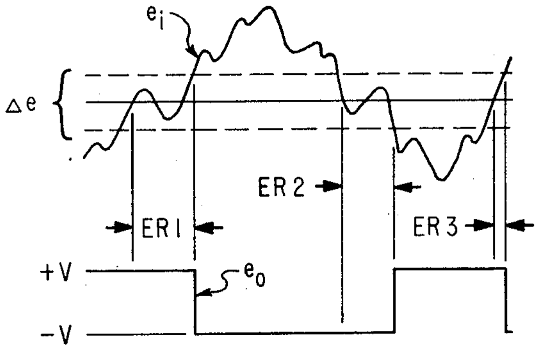
FIG. 4 depicts a timing waveform applicable to the prior art circuit of FIG. 3.

In the circuit of FIG. 3, the output of operational amplifier 20 is fed back through resistor 22 to the plus input. Resistor 22 has a magnitude R2, while resistor 14 has a magnitude R1. (Resistor 12, which should be equal in magnitude to resistor 14 for balancing purposes, also has a magnitude R1.) The feedback produces a hysteresis region designated $\Delta e$ centered at the reference level as shown in FIG. 4. A crossover in the upward direction (resulting in a drop of the output level) is not detected until the overall signal has not only passed through the reference level but has also crossed the upper hysteresis level. downward direction is not detected until the overall input signal has not only crossed the reference level but has also passed through the lower hysteresis level. This is due to the fact that the output level actually determines the reference potential applied to the plus input of the operational amplifier as a result of the use of feedback resistor 22.

Consider the case in which the input signal is negative and the output is at the +V level. Due to the voltage divider action of resistors 14 and 22, the potential applied at the plus input of the operational amplifier is +V(R1)/(R1R2). This potential is above ground, and in fact is the upper level of the hysteresis range. In order for the output potential to switch to the lower level, it is necessary for the input signal to rise not only to ground but also to the level at the top of the hysteresis region. Thus, as shown in FIG. 4, as the input signal rises the output signal does not change from +V to −V until some time after the actual first crossover. This time is indicated as ER1. The time interval represents an error -- a delay in the switching of the output level.

As soon as the output potential falls to the −V level, the voltage applied to the plus input of the operational amplifier is −V(R1)/(R1+R2), rather than ground. The threshold level is now slightly negative and the output of the operational amplifier does not go positive until the input signal has fallen to this level rather than simply to ground. The resulting time-delay error is designated ER2 in FIG. 4.

In the absence of noise, the error is not as great. This is shown to the right of FIG. 4 where the error ER3 is relatively small. But there is still a time-delay error, and what is important to note is that the error for each crossing depends on whether or not there is any noise present at the input. Furthermore, the error varies as a function of the signal amplitude. In the case of a high-amplitude signal, even with superimposed noise the overall input signal passes through the hysteresis region in a relatively short time compared to the period of the signal. Thus the time-delay error is small. But in the case of a low-amplitude signal, it may take a considerable portion of the signal period (the signal period is defined as the time interval between expected crossovers) before the signal rises or falls from ground to one of the bounds of the hysteresis region. In such a case, very large time-delay errors may be present.

It should be noted that the relative magnitudes R1 and R2 are determined by the characteristics of the operational amplifier and the maximum input signal magnitude. There is a maximum potential difference which may exist between the two input terminals of the amplifier without it being destroyed. When the input signal is of one polarity, the potential applied to the plus input of the amplifier is of the opposite polarity and of a magnitude equal to V(R1)/(R1+R2). Depending on the magnitude of the outputs of the operational amplifier and the maximum expected input signal amplitude, magnitudes R1 and R2 are selected such that the maximum potential difference between the two input terminals of the operational amplifier does not exceed the safe value.

Figure 5:
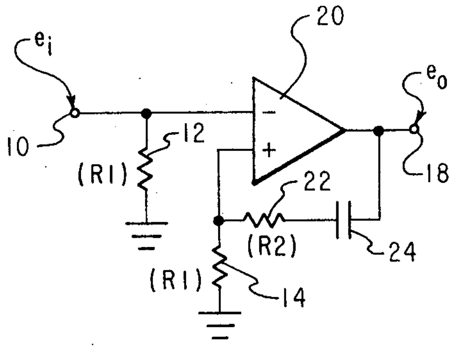
FIG. 5 depicts an illustrative embodiment of my invention.
Figure 6:
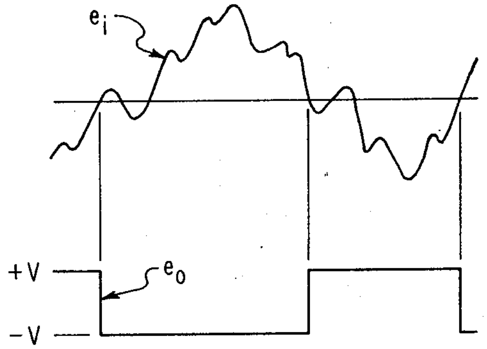
FIG. 6 depicts a timing waveform applicable to the circuit of FIG. 5.

The circuit of FIG. 5 is the same as that of FIG. 3 except that capacitor 24 is added to the feedback circuit. This capacitor functions to introduce a hysteresis effect only after the detection of a zero crossing, the hysteresis effect dying out before the next expected crossing. Suppose the input signal is negative and the output level is at +V. Assuming that capacitor 24 has fully charged, no current flows through resistors 14 and 22 and the plus input of the operational amplifier is held at ground. Consequently, the output of the amplifier switches to the −V level as soon as the input signal rises to the ground level. This is what happens in the case of the circuit of FIG. 1. But while superimposed noise can cause the output in the circuit of FIG. 1 to rise once again, this is not possible in the circuit of FIG. 5. As soon as the output of the operational amplifier drops to the −V level, the potential at the plus input of the operational amplifier drops to −V(R1)/(R1+R2). This is due to the fact that the drop across the capacitor cannot change instantaneously and thus the voltage which is fed back to the plus input of the operational amplifier in FIG. 5 is the same as the voltage which is fed back in the circuit of FIG. 3. The hysteresis effect which is thus introduced prevents noise superimposed on the input signal from triggering the operational amplifier once again. But the hysteresis effect is introduced only after the output of the operational amplifier changes state. Thus there is no time-delay error as there is for the circuit of FIG. 3.

For there to be no time-delay errors, however, the voltage at the plus input of the operational amplifier must return to ground before the next crossing. It is only in this way that the output of the operational amplifier can switch levels immediately upon the input signal crossing the ground level. As soon as the output level changes in value, current starts to flow through capacitor 24, and resistors 14 and 22 to ground. The capacitor changes charges and the magnitude of the voltage across resistor 14 decreases. Provided that the capacitor is fully charged by the time that the next crossover occurs, the reference potential applied to the plus input of the operational amplifier will be ground and there will be no time-delay error.

The equation defining the potential $e$ at the plus input of the operational amplifier, beginning with the time that the output switches to the +V level, is as follows:

$$e=\frac{+V(R1)}{R1+R2}\,\epsilon^{-t/T},\ T=(R1+R2)C.$$

At the instant after the output potential changes level, since $t = 0$, the reference potential applied to the plus input of the operational amplifiers is the same as that in the circuit of FIG. 3. But as $t$ increases, the reference potential falls toward ground. Similar remarks apply to a crossover in the upward direction where the output level of the operational amplifier drops to −V. The hysteresis effect is introduced only immediately after a true crossover is detected and it dies out before the next expected crossover. For all practical purposes, the feedback voltage applied to the plus input of the operational amplifier is essentially at ground potential when the ratio $t/I = 5$. Thus all that is required is to choose magnitudes for elements 14, 22 and 24 such that T is substantially less (e.g., by a factor of 5) than the time interval between crossovers for the nominal data rate.

Although the invention has been described with reference to a particular embodiment, it is to be understood that this embodiment is merely illustrative of the application of the principles of the invention. For example, it is possible to provide a feedback circuit which is purely capacitive, that is, resistor 22 can be omitted. In such a case, the full output potential (+V or −V) is fed back to the plus input of the operational amplifier immediately after the output changes state, the capacitor thereafter charging so that the potential applied to the plus input returns to ground prior to the next zero crossing. Of course, without resistor 22, the potential applied to the plus input of the operational amplifier is much greater in magnitude immediately following a change in state of the output, and a much greater potential difference may arise between the two inputs of the amplifier; care must be taken that this difference does not exceed the maximum safe value. It is also possible to include another resistor in parallel with capacitor 24 in the circuit of FIG. 5. The important thing is that a mechanism be provided for introducing a hysteresis effect only immediately after the output of the operational amplifier switches levels, the hysteresis effect then dying out prior to the next crossover. This is accomplished in the illustrative embodiment of the invention with the use of capacitive feedback. Thus it is to be understood that numerous modifications may be made in the illustrative embodiment of the invention and other arrangements may be devised without departing from the spirit and scope of the invention.

What I claim is:

1. A crossover detector comprising an operational amplifier having first and second input terminals and an output terminal, means for applying an input signal to said first input terminal, means for extending a reference potential to said second input terminal, said reference potential being equal to the threshold level at which crossovers in said input signal are to be detected, said operational amplifier being operative to apply one of two potentials at its output terminal in accordance with the relative polarities of the potentials at said first and second input terminals, and means responsive immediately after a crossover occurs above or below said reference potential for introducing a hysteresis effect in the operation of said operational amplifier and for allowing said hysteresis effect to decay prior to the next expected crossover in said input signal.

2. A crossover detector in accordance with claim 1 wherein said last-mentioned means controls a step change in the potential applied to said second input terminal and thereafter controls said potential to decay exponentially with the decay being substantially complete prior to the next expected crossover.

3. A crossover detector in accordance with claim 1 wherein said last-mentioned means is a capacitive feedback circuit connected between said output terminal and said second input terminal.

4. A crossover detector in accordance with claim 3 wherein said capacitive feedback circuit includes resistor means connected between said second input terminal and ground.

5. A crossover detector in accordance with claim 4 wherein said capacitive feedback circuit includes additional resistor means connected in series with said capacitive feedback circuit between said output terminal and said second input terminal.

6. A crossover detector in accordance with claim 3 wherein said capacitive feedback circuit having a time constant that is substantially less than the anticipated time interval between successive crossovers to be detected, said operational amplifier having a negative output signal when the signal at said first input terminal is positive relative to the signal at said second input terminal as compared with the output signal of said operational amplifier when the signal at said second input terminal is positive relative to the signal at said first input terminal.

7. A crossover detector in accordance with claim 1 wherein said means responsive immediately after a crossover occurs being responsive to a change in said output potential for changing the potential applied to said second input terminal and for allowing the potential at said second input terminal to return to said reference potential prior to the next expected crossover in said input signal.

* * * * *